US011635948B2

United States Patent
Rapson et al.

(10) Patent No.: US 11,635,948 B2
(45) Date of Patent: Apr. 25, 2023

(54) SYSTEMS AND METHODS FOR MAPPING SOFTWARE APPLICATIONS INTERDEPENDENCIES

(71) Applicant: vFunction, Inc., Menlo Park, CA (US)

(72) Inventors: Amir Rapson, Shoham (IL); Uri Simchoni, Kfar Yechezkel (IL); Ori Saporta, Givatayim (IL)

(73) Assignee: VFUNCTION, INC., Menlo Park, CA (US)

( * ) Notice: Subject to any disclaimer, the term of this patent is extended or adjusted under 35 U.S.C. 154(b) by 276 days.

(21) Appl. No.: 16/872,977

(22) Filed: May 12, 2020

(65) Prior Publication Data

US 2020/0272441 A1  Aug. 27, 2020

Related U.S. Application Data

(63) Continuation of application No. PCT/US2018/064729, filed on Dec. 10, 2018.

(60) Provisional application No. 62/597,372, filed on Dec. 11, 2017.

(51) Int. Cl.
*G06F 9/44* (2018.01)
*G06F 8/41* (2018.01)
*G06F 9/54* (2006.01)

(52) U.S. Cl.
CPC .............. *G06F 8/433* (2013.01); *G06F 8/443* (2013.01); *G06F 9/542* (2013.01)

(58) Field of Classification Search
None
See application file for complete search history.

(56) References Cited

U.S. PATENT DOCUMENTS

| 9,032,380 | B1 | 5/2015 | Ruthramoorthy et al. |
| 2013/0198760 | A1* | 8/2013 | Cuadra ................. G06F 9/4881 718/106 |
| 2013/0275958 | A1* | 10/2013 | Ivanov ..................... G06F 8/61 717/174 |
| 2015/0020066 | A1 | 1/2015 | Kirk et al. |
| 2016/0301625 | A1* | 10/2016 | Rios ........................ G06F 9/547 |
| 2018/0181380 | A1* | 6/2018 | Kasahara ............... G06F 8/433 |
| 2019/0005242 | A1* | 1/2019 | Agarwal ............... G06F 21/564 |
| 2019/0155667 | A1* | 5/2019 | Kirkpatrick ........... H04L 67/146 |
| 2019/0384651 | A1* | 12/2019 | Newburn ................. G06F 9/54 |

OTHER PUBLICATIONS

Fonseca, et al., "Automatic Parallelization: Executing Sequential Programs on a Task-Based Parallel Runtime," Coimbra, Portugal, Apr. 2016, pp. 1-23.
The International Search Report and The Written Opinion from the International Searching Authority for PCT/US2018/064729, dated Apr. 5, 2019, ISA/EPO, Rijswijk, The Netherlands.

* cited by examiner

Primary Examiner — Insun Kang
(74) Attorney, Agent, or Firm — M&B IP Analysts, LLC (57) ABSTRACT

Systems and methods method for mapping between function calls and entities of the computer program. The method includes executing a computer program in a first computing environment; determining a first entity of the computer program to track; assigning an identifier to the first entity; determining the first entity has been accessed by at least one function call; and mapping the at least one function call with the identifier of the first entity; generating a cluster including the at least one function, wherein the cluster may be executed independently from the rest of the computer program.

16 Claims, 7 Drawing Sheets

SYSTEMS AND METHODS FOR MAPPING SOFTWARE APPLICATIONS INTERDEPENDENCIES

CROSS-REFERENCE TO RELATED APPLICATIONS

This application is a continuation of International Application No U.S. Provisional Application No. PCT/US2018/064729 filed on Dec. 10, 2018, which claims priority from U.S. Provisional No. 62/597,372, filed Dec. 11, 2017, the contents of which are hereby incorporated by reference.

BACKGROUND

Computer programs comprise instructions that are typically written in serial form. Such instructions may include methods or functions that perform a specific task for the computer program. For example, an "add" function may add two provided numbers together. During execution of a computer program, each line of code and/or function may typically be executed line-by-line in sequence.

SUMMARY

Recent advances in technology have enabled computer networks to operate with increased speed and bandwidth, allowing for fast and efficient transmission of data between networked computers and computing environments. Such advances have enabled the creation of distributed computing infrastructures, such as cloud computing infrastructures and serverless infrastructures. Computer programs may be sent to execute on such distributed infrastructures to reduce strain on the processor of the sending computer and also to execute certain programs more efficiently. However, in existing systems, efficiency is still limited by the monolithic properties of computer programs, some of which may be decades-old. Rewriting such programs to take advantage of a distributed infrastructure such as a cloud or serverless infrastructure is expensive in both time and capital. Additionally, users and organizations may struggle to understand interdependencies within such programs.

Systems and methods are described to enable the effective mapping of monolithic computer programs into clusters of functions that may be separated out of a computer program in a way that may ensure such functions are of a similar domain. For example, a similar domain may be inferred by tracking memory objects, threads, and other functions accessed and/or modified by one or more functions. Separating such a cluster of functions away from the computer program may allow the cluster to be offloaded and executed in a distributed environment. In an example embodiment, a system may comprise a processor and memory coupled to the processor, wherein the memory comprises executable instructions that when executed by the processor cause the processor to effectuate operations described herein. The system may begin execution of a computer program in a first computing environment. The first computing environment may be any suitable computing environment, such as a virtual runtime environment or a local software package, which may be responsible for tracking program entities.

The system may then determine a first entity of the computer program to track and may assign an identifier to the first entity. The first entity may comprise a variable, a file descriptor or handle, a synchronization object, a spawned thread, or a function call. The system may optionally assign a monitor to the first entity, wherein the monitor generates an event for each access to the entity. The system may determine, via the monitor or otherwise, that the first entity has been accessed by a function call and may associate the function call with the identifier of the first entity. The system may further determine one or more additional function calls that access the first entity and associate those additional function calls with the first entity. The system may then generate a cluster comprising function call and the additional function calls. The cluster may be distributed to a second computing environment for execution, wherein the second environment is a computing environment other than the first computing environment. For example, a cloud computing environment may be such a second computing environment. The cluster of functions calls may then be executed in the second computing environment.

The system may also generate one or more additional clusters comprising function calls associated with other entities of the computer program. Each cluster may comprise a logical component of the computer program, and an application programming interface (API) may be generated that comprises functions calls to each logical component. Additional practices and methods are used to ensure the precision and correctness when executing on a second computing environment. Specifically, the system may determine the minimal context required to invoke each cluster on a separate environment. The minimal context is comprised of a set of entities that are required for a specific function to execute. The set of entities may also be comprised of partial objects, limited to specific variables and members of the object that are required for the function to execute.

Furthermore, the system may enforce the use of this minimal context on the second environment by not allowing access to any context beyond the defined minimal context.

Such systems and methods may be used on existing or legacy computer programs to determine clusters of interdependent functions, which may be used to execute the legacy computer programs more efficiently at least in terms of time, cost, and scalability. Because of this, software developers may not need to change existing coding practices or existing computer programs in order to take advantage of distributed computing infrastructures. Further, such clusters may also be executed and re-executed in such a distributed infrastructure without the need to execute other, larger segments of the computer program, allowing for near-infinite scalability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed.

DETAILED DESCRIPTION

Recent advances in technology have enabled computer networks to have increased speed and bandwidth, allowing for fast and efficient transmission of data between networked computers and computing environments. Such advances have enabled the creation of distributed computing infrastructures, such as cloud computing infrastructures and serverless infrastructures. A cloud may work akin to a computer processor having many processing units. For example, a cloud may comprise tens of thousands of processing units. A serverless infrastructure may comprise a system wherein one or more services or microservices are created for a function, and those services may be executed when a call to the function is made. These services or microservices may continue to be hosted in the serverless infrastructure after creation to allow the function to be quickly and efficiently computed over and over again. Computer programs may be sent to execute on such distributed environments to reduce strain on the processor of the sending computer and also to execute certain programs more efficiently. However, in existing systems, efficiency is still limited by the monolithic properties of computer programs, some of which may be decades-old. Rewriting such programs to take advantage of a distributed infrastructure such as a cloud or serverless infrastructure is expensive in both time and capital. Additionally, users and organizations may struggle to understand interdependencies within such programs, making rewriting such programs and designing new services for such programs immensely difficult.

Systems and methods are described to enable the effective mapping of monolithic computer programs into clusters of functions that may be separated out of a computer program in a way that may ensure such functions are of a similar domain. For example, a similar domain may be inferred by tracking memory objects, threads, and other functions accessed and/or modified by one or more functions. Separating such a cluster of functions away from the computer program may allow the cluster to be offloaded and executed in a distributed environment. In an example embodiment, a system may comprise a processor and memory coupled to the processor, wherein the memory comprises executable instructions that when executed by the processor cause the processor to effectuate operations described herein. The system may begin execution of a computer program in a first computing environment. The first computing environment may be any suitable computing environment, such as a virtual runtime environment or a local software package, which may be responsible for tracking program entities. The system may then determine a first entity of the computer program to track and may assign an identifier to the first entity. The first entity may comprise a variable, a file descriptor or handle, a synchronization object, a spawned thread, or a function call. The system may optionally assign a monitor to the first entity, wherein the monitor generates an event for each access to the entity. The system may determine, via the monitor or otherwise, that the first entity has been accessed by a function call and may associate the function call with the identifier of the first entity. Access of an entity may comprise a read, a write, or both.

The system may further determine one or more additional function calls that access the first entity and associate those additional function calls with the first entity. The system may then generate a cluster comprising function call and the additional function calls.

The cluster may be distributed to a second computing environment for execution, wherein the second environment is a computing environment other than the first computing environment. The second computing environment may be any suitable computing environment, such as a cloud computing infrastructure, a serverless computing infrastructure, an enterprise computing infrastructure, or a remote computer. The cluster of functions calls may be executed in the second computing environment. The system may also generate one or more additional clusters comprising function calls associated with other entities of the computer program. Each cluster may comprise a logical component of the computer program, and an application programming interface (API) may be generated that comprises functions calls to each logical component.

The system may also determine the minimal context required to invoke each cluster. Context comprises a full set of all the possible entities that can be accessed or modified by the execution of a cluster. Minimal context being the minimal subset of said context that is required for the execution produce the same results as on the first computing environment. The system may then strictly enforce the use of the minimal context to avoid unexpected behavior during the execution.

An analysis may first be performed on a computer program to determine entities that may be tracked in the computer program. Tracked entities may comprise one or more variables, file descriptors or handles, synchronization objects, spawned threads, or function calls. The analysis may be performed at run-time or statically before the program is executed and may be performed at any level of code, pre-compilation or post-compilation. For example, the analysis may be performed on binary code, readable source code, assembly code, or any other level, such as for example, Java bytecode or .NET CIL code.

In an embodiment, a computer program may be running inside a run-time environment (RTE), such as for example a virtual machine (VM), which may perform an analysis, as described above, during run-time. While the program is executing, the RTE, or an agent associated with the RTE, may determine one or more entities to track and assign respective identifiers to those entities.

Figure 1:
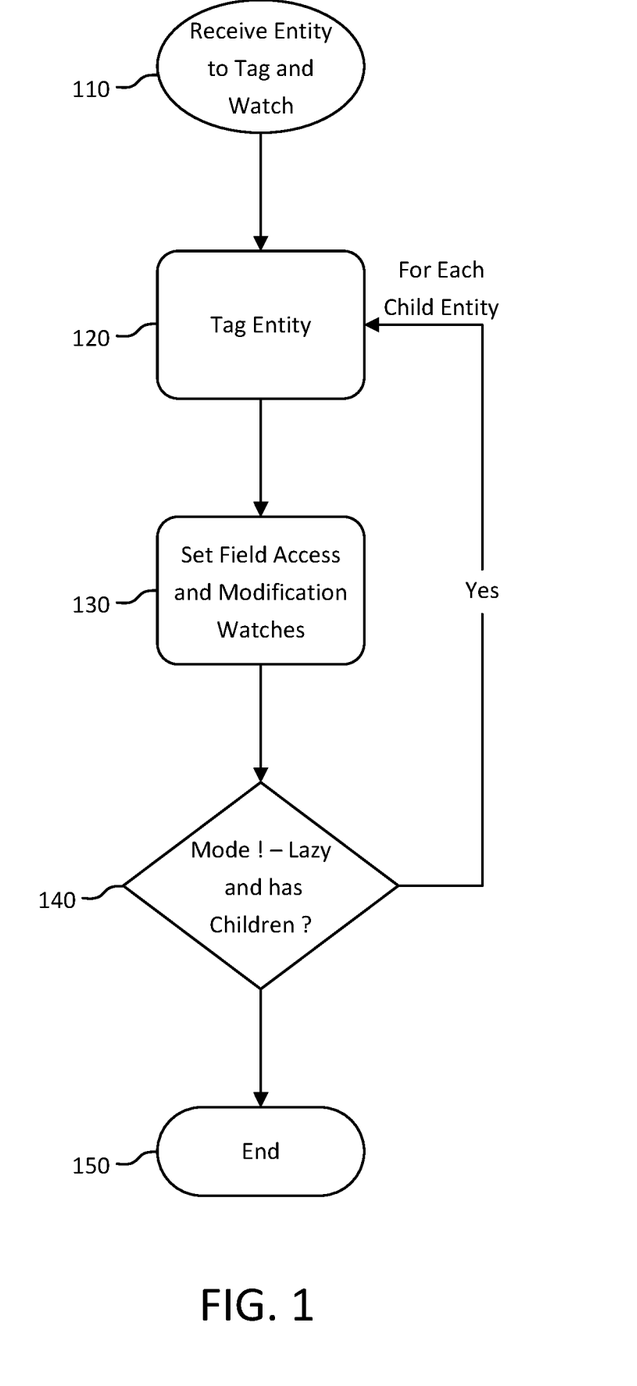
FIG. 1 is a flow diagram depicting an example method for tagging/identifying entities of a computer program.

FIG. 1 is an example flow diagram depicting an example method for tagging/identifying entities of a computer program. Although FIG. 1 is depicted as a sequence of blocks, the depicted sequences should not be construed as limiting the scope of the present disclosure. In various cases, aspects, and embodiments, the blocks and described operations may be altered, omitted, reordered, or performed in parallel.

At block 110, an entity, or "object", may be received to tag and watch. For example, the RTE may analyze a computer program and determine to track an array of variables to determine interdependencies, i.e., a mapping, between function calls and entities of the computer program.

At block 120, the entity may be tagged by assigning an identifier. For example, an identifier may be assigned to the entity to track the entity's accesses throughout execution of the computer program. A value of the entity may be stored, and the stored value may be associated with the identifier assigned to the entity.

At block 130, the entity may be assigned a monitor. Such a monitor may generate an event each time the tagged entity is accessed. For example, if a cell of an array is modified by a function call, such a monitor may generate an event in the RTE indicating a modification has occurred.

At block 140, the system may determine if the tagged entity comprises children entities. It may also determine its current mode of operation. Possible modes may be "lazy" and "not lazy". If the tagged entity comprises children entities and depending on the mode of operation, the system may repeat the process beginning at block 120 to tag and/or monitor each child entity and any children of each child entity until no more children remain. In this manner, each child entity may be assigned an identifier and/or monitor. For example, the RTE may tag the array of variables and iterate through the array to tag each variable in the array. Such recursive tagging may be performed by any suitable process or with any suitable tool, such as for example JVMTI for Java. If the tagged entity does not comprise children entities, the system may stop tagging entities, as indicated by block 150. Alternatively, the system may track child entities only when an event occurs. In this case, the child entity would be handled if it was accessed or modified through its tracked parent object. For example, The RTE may tag an object and watch its fields. When a field is accessed it will then tag the object in the accessed field and watch the child object's fields.

Figure 2:
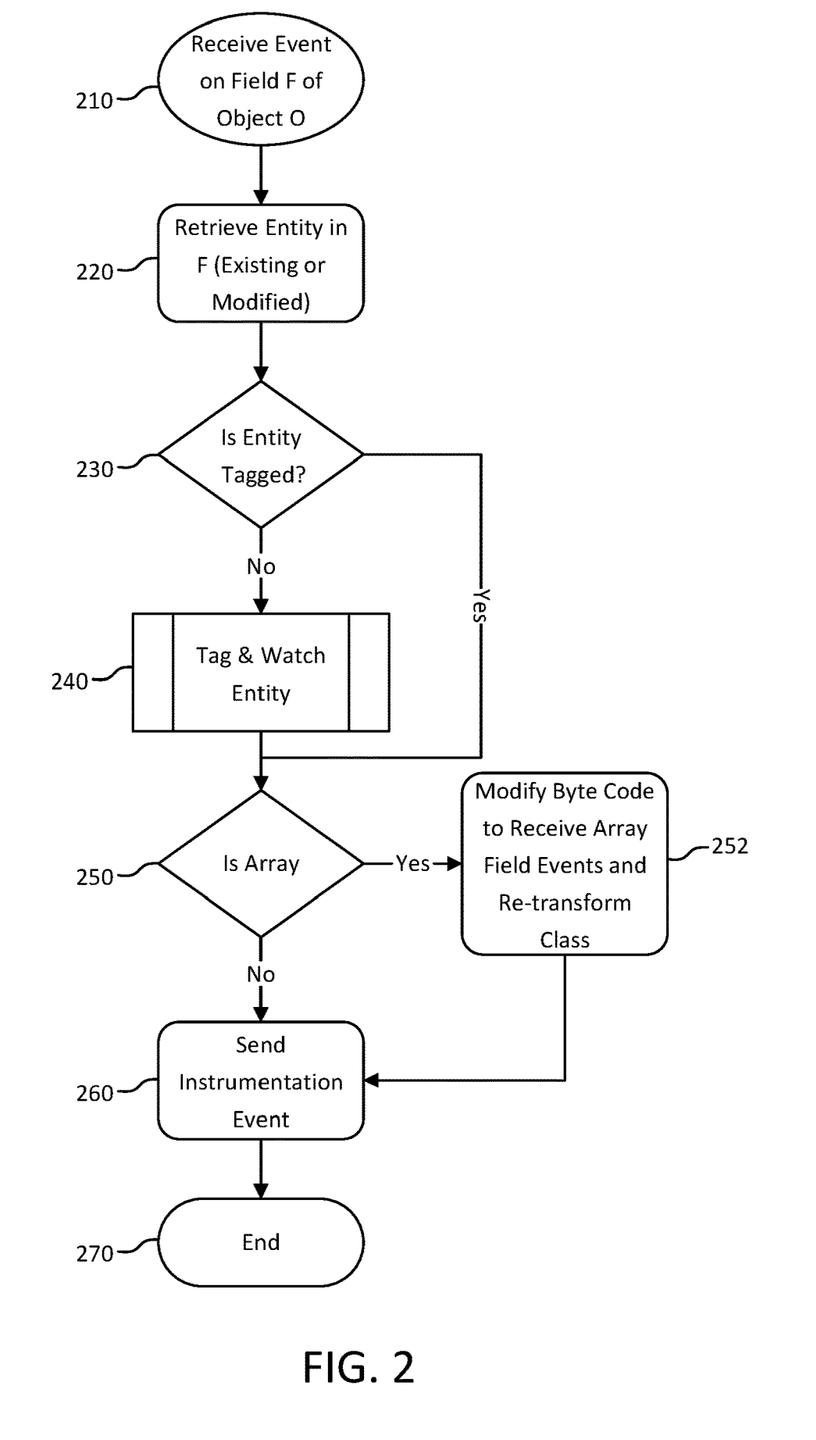
FIG. 2 is a flow diagram depicting an example method for analyzing an access of a tracked entity.

FIG. 2 is an example flow diagram depicting an example method for analyzing an access of a tracked entity. Although FIG. 2 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 2 may occur via the use of an RTE, as described above. Need to redo the entire thing after we finalize the diagram At block 210, an access of a tagged entity may be determined to have occurred. An access may be a read or a write of a tagged entity, which may be performed by one or more functions/function calls. An access may be determined at a binary code level, readable source code level, assembly code level, or any other level, such as for example, at a Java bytecode level or a .NET CIL code level. An access event may be received from a monitor assigned to the tagged entity or may be determined during runtime by the use of, for example, the RTE. For example, events may be received for each bytecode or CIL code used to access the tagged entity (e.g., in Java: getstatic, getfield, putstatic, putfield, and in .NET: ldsfld, ldfld, stsfld, stfld). At block 220, the system may retrieve the value of the entity that was accessed. For example, the entity may be the value of a field or an array cell.

At block 230, it is determined whether the accessed entity is already tagged. For example, if the access replaced the value in a field or array cell or the operation mode is "lazy" the entity may not be tagged. If the entity is not tagged the process may continue at block 240. If it was already tagged, the process may continue at block 250.

At block 240, a process of tagging and watching (detailed in FIG. 1) on the untagged object is being performed. For example, in Java, objects that are not trivial types such as integers are not modified in-place, but rather replaced by new objects and later discarded. These new objects may then need to be tagged to continue the tracking of the entity. For example, the system may assign an identifier to the modified first entity and may assign a monitor to the modified first entity. In another example, the system may determine that a tagged entity may comprise one or more child entities. The system may then assign an identifier to each child entity and may assign a monitor to each child entity. For modifications where the entity may be modified in-place, a stored value associated with an identifier of the entity may be updated to reflect the modification.

At block 250, it is determined whether the accessed entity was an array. Moreover, it is checked for array access and modification in the bytecode or CIL of a function performing the access. For example, some of the array access and modification codes are aastore, aaload in Java and ldelem, stelem in .NET. If the system determines such codes are used by the function, the process may continue at block 252. Otherwise, the process may continue at block 260.

At block 252, the code of the function accessing the entity to call a native function to tag a new object before the new object is set in the array or to monitor access of the elements of the array is modified. Such a process may be performed via the use of any suitable tools, such as for example ASM.

At block 260, an event may be stored after being sent from/through an instrumentation mechanism. Such an event may comprise an identifier of a function that accessed the first entity, a type of the first entity, an identifier of the first entity, and a type of event. For example, an event may take the form <function name, entity type, entity, access type>. Offline understanding and analysis of such stored functions may aid in determining interdependencies between functions of the computer program based on their usage of specific resources in the system. For example, one or more stored events may be analyzed to determine one or more functions that access common entities of the computer program. For example, the one or more functions may have access to common static variables, synchronization objects, OS handles, may call one another, and may spawn threads that call another function. The system may cluster these one or more functions into a logical component, wherein the logical component may be executed in a second computing environment.

Code Example 1 of the Appendix illustrates example source code of a system function generating events for a tracked entity. Code Example 1 illustrates bytecode for an example Java "ArrayList.add" function. Assume the fields "size" and "elementData" are tagged entities having their values watched. An access event for "size" may occur on line #7, and an access event for "elementData" may occur on line #16. Because "elementData" is an array, bytecodes aaload and aastore may be used to access "elementData". Because there is an "aastore" command on line #42, the bytecode may be modified to send an array modification event with the newly added object. Events may also occur on lines #21, #28, #37, #45, and #50. Note that on line #50 even though a modification occurs, the entity does not need to be tagged because the entity is an integer and not an object, e.g., block 232 of FIG. 2 would not need to be performed.

In an example embodiment, a system may begin execution of a computer program in an RTE, such as a run-time virtual machine. After identifying one or more entities to track, the system may create data structures in computer memory to assign and store identifiers and/or monitors associated with the entities. The system may also store a value of each entity and associate the stored value with the assigned identifier of each entity. As the computer program executes, the system may determine when an entity is accessed by a function call. The access may comprise a read or a write and may be determined by an event generated by an assigned monitor. If the system determines the value of the entity was modified, the system may update the stored value of the entity to the modified value. The system may associate the function call with the identifier of the entity. In example embodiments, the association may be stored as an access event comprising an identifier of the function that accessed the first entity, a type of the first entity, the identifier of the first entity, and the type of access. Such events may be stored in a database for later analysis. The system may continue this process and determine one or more additional function calls that access the entity and associate those additional function calls with the entity. The system may analyze events, which may be stored in the database, for interdependencies and may then generate a cluster comprising the function call and the additional function calls based on their association with the entity. The system may repeat this process to generate one or more additional clusters comprising function calls associated with other entities of the computer program. Such clusters may be able to be executed independently from the rest of the computer program. As such, an application programming interface (API) may then be generated that comprises functions calls to each cluster, and each cluster may be executed in a distributed environment.

In an example embodiment, Java may be utilized to enable the use of the processes described herein. In another example embodiment, .NET may be utilized to enable the use of the processes described herein.

Figure 3:
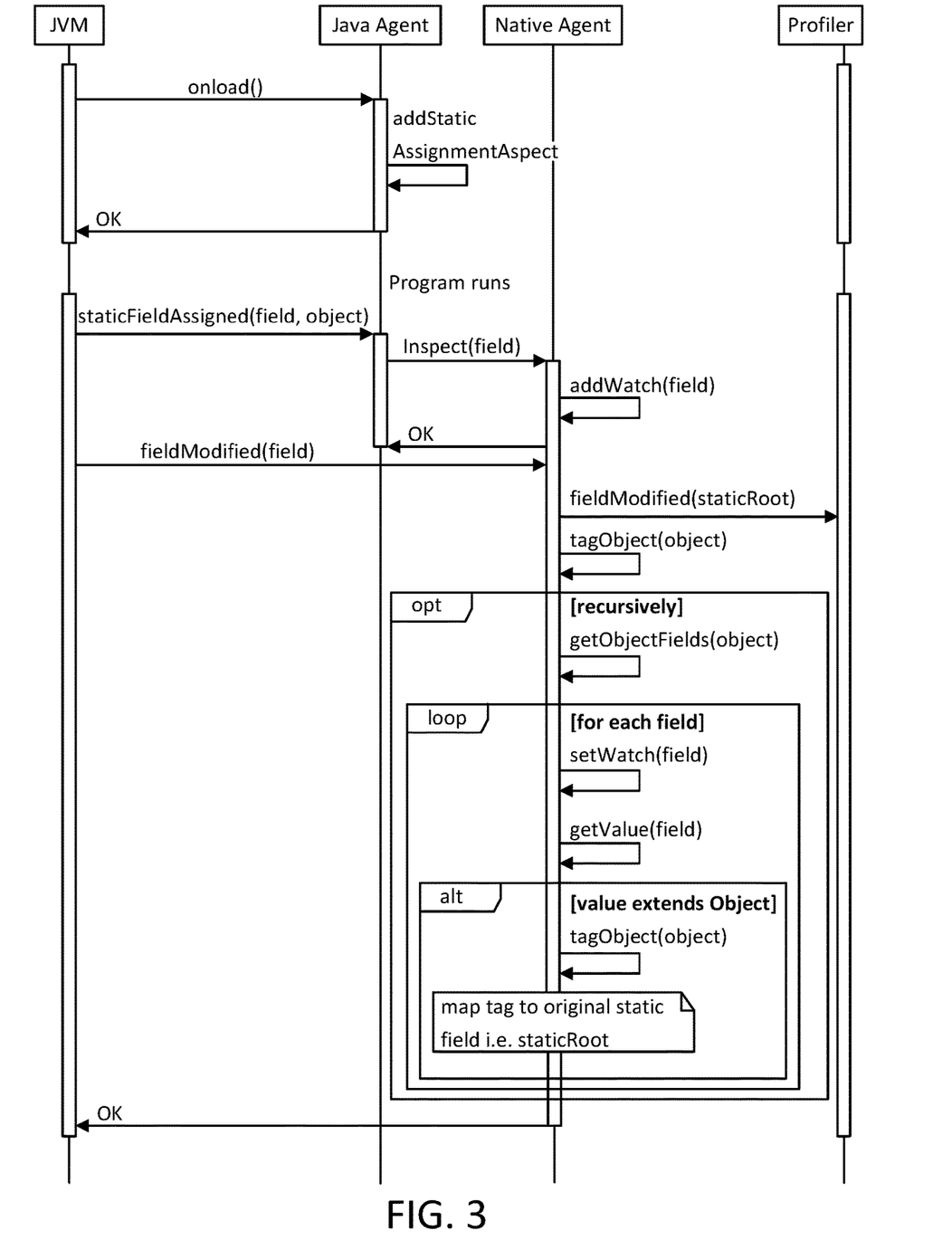
FIGS. 3 and 4 illustrate an example embodiment using a Java framework.
Figure 4:
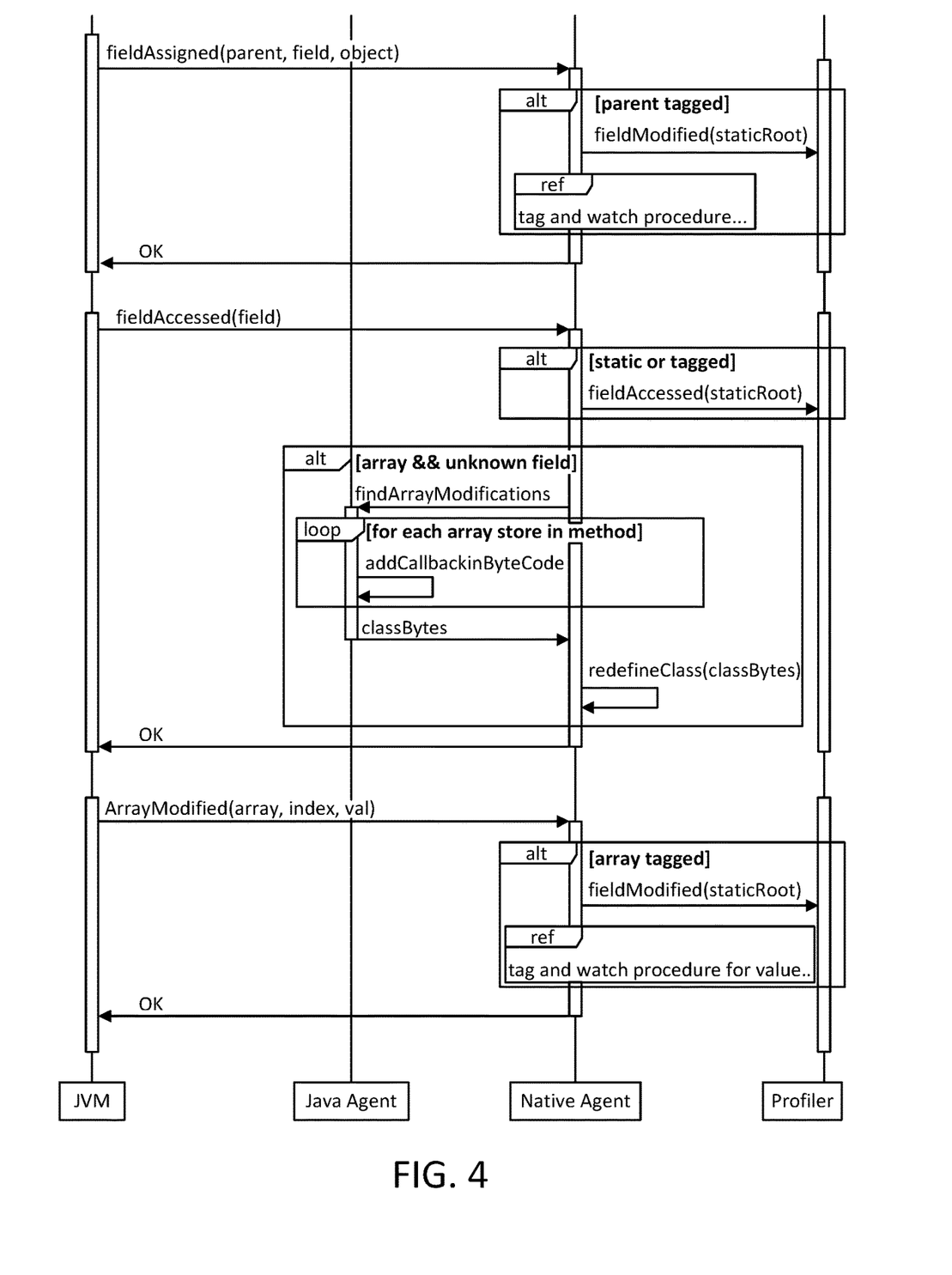

FIGS. 3 and 4 illustrate example embodiments using components in a Java framework. For example, a Java virtual machine (JVM) may execute a computer program and a Java Agent and Native Agent may identify entities to track and their associated access events. The Profiler may be sent such access events to track the entities over time and analyze the access events to determine interdependencies between functions of the computer program.

Figure 5:
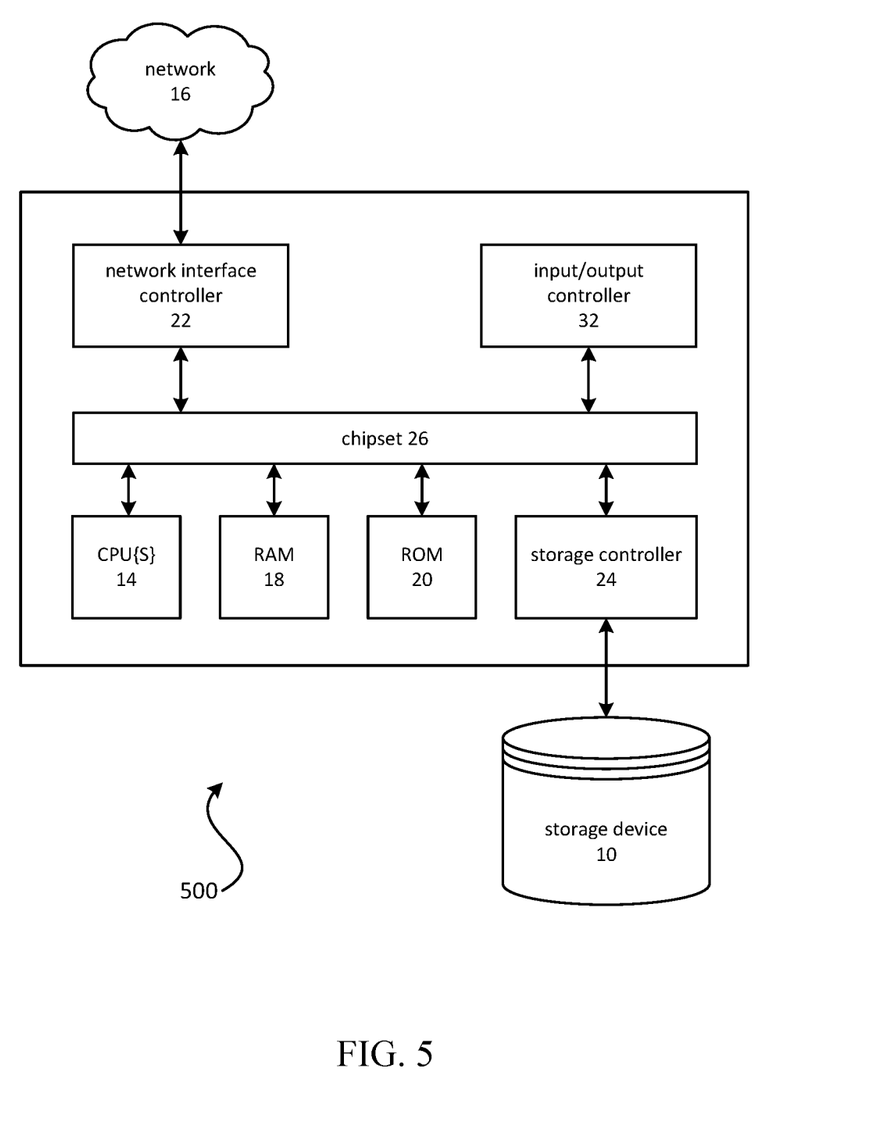
FIG. 5 depicts an example computing system.

FIG. 5 depicts a computing device that may be used in various system components, such as any of those described and/or depicted with regard to FIGS. 1, 2, 4A, and 4B. The computer architecture shown in FIG. 5 may correspond to a desktop computer, laptop, tablet, network appliance, e-reader, smartphone, or other computing device, and may be utilized to execute any aspects of the computers described herein, such as to implement the operating procedures of FIGS. 1, 2, 4A, and 4B.

A computing device 500 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 500.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 500. The chipset 26 may further provide an interface to a computer-readable storage medium, such as a read-only memory ("ROM") 20 or non-volatile RAM ("NVRAM") (not shown), for storing basic routines that may help to start up the computing device 500 and to transfer information between the various components and devices. The ROM 20 or NVRAM may also store other software components necessary for the operation of the computing device 500 in accordance with the aspects described herein.

The computing device 500 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 500, connecting the computing device to other types of networks and remote computer systems.

The computing device 500 may be connected to a mass storage device 10 that provides non-volatile storage for the computing device 500. The mass storage device 10 may store system programs, application programs, other program modules, and data, used to implement the processes and systems described in greater detail herein. The mass storage device 10 may be connected to computing device 500 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 500 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may further read information from the mass storage device 10 by detecting the physical states or characteristics of one or more particular locations within the physical storage units.

In addition to the mass storage device 10 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 500. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 500.

The mass storage device 10 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 14 transition between states, as described above. The computing device 500 may have access to computer-readable storage media storing computer-executable instructions, which, when executed by the computing device 500, may perform operating procedures depicted in FIGS. 1, 2, 4A, and 4B.

The computing device 500 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing node may be a physical computing device, such as the computing device 500 of FIG. 5. A computing node may also include a virtual machine host process and one or more virtual machine instances operating on a physical computing device, such as the computing device 500. Computer-executable instructions may be executed by the physical hardware of a computing device indirectly through interpretation and/or execution of instructions stored and executed in the context of a virtual machine.

Figure 6A:
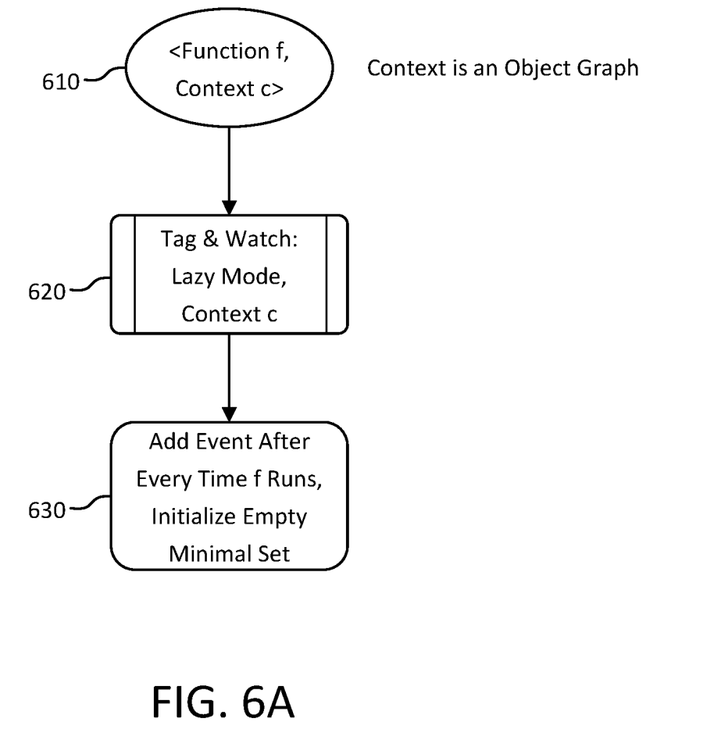
FIG. 6A-B are flow diagrams depicting the process of minimizing a function's context.
Figure 6B:
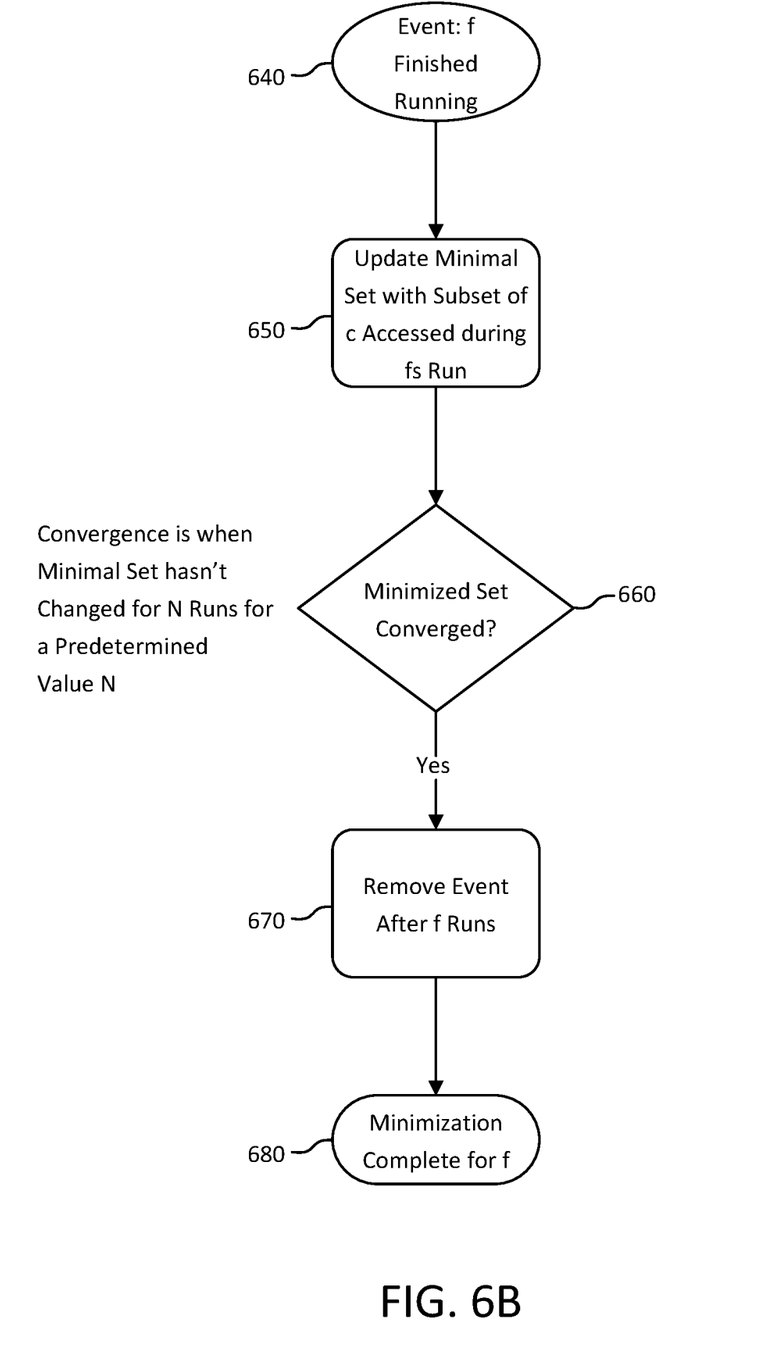

FIG. 6A-B depict the process of minimization of the context of a specific function f. The result of the process, if successful is a minimal set of entities required for f to run properly resulting in the same output as if it ran given its full original context.

At block 610, the process is started given a function f to minimize along with its original full context. The context is a set of entities that are statically defined the function f and any subsequent functions it calls might be able to access. The context may comprise local and static variables or objects.

At block 620, the system may call the tag and watch process (details in FIG. 1) on any or all entities in the given context.

At block 630, the system may add an event to be called after every time function f is called. Said event is called with all the parameters f is called with along with the minimal set which the system now initializes to an empty set.

At block 640, the system may receive an event after f runs. It receives the identity of f along with its parameters, the full context c and the minimal set.

At block 650, the system may gather the instrumentation events depicting entities accessed during the duration of f's run (as detailed in FIG. 2). The system may use these entities to the minimal set. For example, if during its run f accessed entity x, the system may add x to the minimal set.

At block 660, the system may check to determine whether the minimal set has changed as a result of the last run off. If the minimal set has not changed for a certain number of runs it may decide that the minimal set has converged. The number may either be predefined or dynamically calculated. For example, if the minimal set has not changed for the last 10 runs off it might constitute convergence. If convergence was achieved the process may continue at block 670. Otherwise, the process breaks and resumes from block 640 after the next time f runs.

At block 670, the system may remove the even from firing after f runs.

Applicant has described methods and systems for enabling the distribution of monolithic, or otherwise inefficient computer programs for efficient execution in distributed computing environments. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

APPENDIX

Code Example 1

```
public void add(int, E);
    descriptor: (ILjava/lang/Object;)V
    flags: ACC_PUBLIC
    Code: stack=6, locals=3, args_size=3
        0:   aload_0
        1:   iload_1
        2:   invokespecial    #42 // Method rangeCheckForAdd:(I)V
        5:   aload_0
        6:   aload_0
        7:   getfield         #2 // Field size:I
       10:   iconst_1
       11:   iadd
       12:   invokespecial    #41 // Method ensureCapacityInternal:(I)V
       15:   aload_0
       16:   getfield         #5 // Field elementData:[Ljava/lang/Object;
       19:   iload_1
       20:   aload_0
       21:   getfield         #5// Field elementData:[Ljava/lang/Object;
       24:   iload_1
       25:   iconst_1
       26:   iadd
       27:   aload_0
       28:   getfield         #2 // Field size:I
       31:   iload_1
       32:   isub
       33:   invokestatic     #38 // Method java/lang/System.arraycopy:(...)V
       36:   aload_0
       37:   getfield         #5 // Field elementData:[Ljava/lang/Object;
       40:   iload_1
       41:   aload_2
       42:   aastore
       43:   aload_0
       44:   dup
       45:   getfield         #2 // Field size:I
       48:   iconst_1
       49:   iadd
       50:   putfield         #2 // Field size:I
       53:   returnPage
```

What is claimed:

1. A method for mapping between function calls and entities of a plurality of instructions, comprising:
executing the plurality of the instructions in a first computing environment; determining a first entity of the plurality of instructions to track;
assigning an identifier to the first entity; determining that the first entity has been accessed by at least one function call; mapping the at least one function call with the identifier of the first entity; and
generating a cluster including the at least one function call, wherein the cluster is executed independently from the rest of the plurality of the instructions;
generating an application programming interface comprising function calls to each logical component;
executing the cluster in a second computing environment separate from the first computing environment; and
wherein the method further comprising:
assigning a monitor to the first entity, wherein the monitor generates an event for each access to the first entity;
receiving an event indicating a function has accessed the first entity;
determining the first entity comprises one or more child entities;
assigning an identifier to each child entity; and
assigning a monitor to each child entity.

2. The method of claim 1, wherein the first entity comprises any one of: a variable a file descriptor, a handle, a synchronization object, a spawned thread, or a function call.

3. The method of claim 1, further comprising:
determining one or more additional function calls access the first entity; and
mapping the additional function calls and the first entity, wherein the mapping defines interdependencies within the plurality of the instructions.

4. The method of claim 3, further comprising:
determining a minimal set of entities required to invoke function calls in the cluster.

5. The method of claim 3, further comprising:
generating one or more additional clusters comprising function calls associated with other entities of the plurality of the instructions.

6. The method of claim 5, wherein each of a plurality of clusters comprises a logical component of the plurality of the instructions.

7. The method of claim 1, further comprising: enforcing access to an entity set as part of the execution on the second environment; and preventing any additional entity of the at least one function call's original input set to be accessed.

8. The method of claim 7, wherein the second computing environment comprises at least one of: a cloud computing infrastructure; a serverless computing infrastructure; an enterprise computing infrastructure; or a remote computer.

9. The method of claim 1, further comprising: for each child entity: determining that the child entity has been accessed by a first function call; and associating the first function call with the identifier of the child entity.

10. The method of claim 1, wherein the plurality of the instructions is in any one of: an executable form or a pre-compiled form.

11. The method of claim 1, wherein the first computing environment is a virtual runtime environment, and wherein the virtual runtime environment intercepts an access by the at least one function call during execution of the plurality of the instructions.

12. The method of claim 1, further comprising: analyzing one or more stored events to determine one or more functions that access common entities of the plurality of the instructions; and clustering the one or more functions into a first logical component, wherein the first logical component may be executed in the second computing environment.

13. The method of claim 1, further comprising: determining the function modified the first entity; assigning an identifier to the modified first entity; and assigning a monitor to the modified first entity.

14. The method of claim 1, wherein the cluster includes any one of:
a service and a microservice.

15. A non-transitory computer readable medium having stored thereon instructions for causing a processing circuitry to execute a process, the process comprising: executing a plurality of instructions in a first computing environment;
determining a first entity of the computer program to track;
assigning an identifier to the first entity; determining that the first entity has been accessed by at least one function call;
mapping the at least one function call with the identifier of the first entity;
generating a cluster including the at least one function call, wherein the cluster is executed independently from the rest of the plurality of the instructions;
generating an application programming interface comprising function calls to each logical component;
executing the cluster in a second computing environment separate from the first computing environment; and
wherein the process further comprising:
assigning a monitor to the first entity, wherein the monitor generates an event for each access to the first entity;
receiving an event indicating a function has accessed the first entity;
determining the first entity comprises one or more child entities;
assigning an identifier to each child entity; and
assigning a monitor to each child entity.

16. A system for mapping between function calls and entities of a plurality of instructions, comprising:
a processing circuitry; and
a memory, the memory containing instructions that, when executed by the processing circuitry, configure the system to:
execute a plurality of the instructions in a first computing environment;
determine a first entity of the computer program to track;
assign an identifier to the first entity; determine that the first entity has been accessed by at least one function call;
map the at least one function call with the identifier of the first entity;
generate a cluster including the at least one function call, wherein the cluster is executed independently from the rest of the plurality of the instructions;
generate an application programming interface comprising function calls to each logical component;
execute the cluster in a second computing environment separate from the first computing environment; and
wherein the system is further configured to:
assign a monitor to the first entity, wherein the monitor generates an event for each access to the first entity;
receive an event indicating a function has accessed the first entity;
determine the first entity comprises one or more child entities;
assign an identifier to each child entity; and
assign a monitor to each child entity.

\* \* \* \* \*